US012107367B2

(12) United States Patent
Sampson et al.

(10) Patent No.: US 12,107,367 B2
(45) Date of Patent: Oct. 1, 2024

(54) SYSTEM AND APPARATUSES FOR COMMUNICATION PORT CORD RETENTION

(71) Applicant: NCR Corporation, Atlanta, GA (US)

(72) Inventors: Mark James Sampson, Fife (GB); Angus Cunningham, Monifieth (GB)

(73) Assignee: NCR Corporation, Atlanta, GA (US)

( * ) Notice: Subject to any disclaimer, the term of this patent is extended or adjusted under 35 U.S.C. 154(b) by 416 days.

(21) Appl. No.: 17/032,039

(22) Filed: Sep. 25, 2020

(65) Prior Publication Data

US 2022/0102913 A1 Mar. 31, 2022

(51) Int. Cl.

*H01R 13/62* (2006.01)
*H01R 12/70* (2011.01)
*H01R 13/627* (2006.01)
*H01R 12/72* (2011.01)

(52) U.S. Cl.

CPC ..... *H01R 13/6275* (2013.01); *H01R 12/7029* (2013.01); *H01R 12/722* (2013.01)

(58) Field of Classification Search

CPC .... H01R 12/716; H01R 12/721; H01R 12/79; H01R 12/724; H01R 13/6658; H01R 12/57; H01R 13/6582; H01R 13/6275; H01R 13/6594; H01R 12/774; H01R 13/516; H01R 13/6273; H01R 13/6587; H01R 12/72

See application file for complete search history.

(56) References Cited

U.S. PATENT DOCUMENTS

| | | | | |
|---|---|---|---|---|
| 5,755,586 A * | 5/1998 | Knighton | H01R 12/7005 | 439/328 |
| 6,666,695 B1 * | 12/2003 | Yeh | H01R 12/721 | 439/541.5 |
| 8,529,282 B1 * | 9/2013 | Westman | H01R 13/6273 | 439/345 |
| 9,350,116 B1 * | 5/2016 | Morello | H01R 13/633 | |
| 9,525,227 B2 * | 12/2016 | Little | H01R 13/6273 | |
| 2007/0232118 A1 * | 10/2007 | Wu | H01R 13/6335 | 439/353 |
| 2008/0020640 A1 * | 1/2008 | Zhang | H01R 12/00 | 439/607.01 |
| 2008/0176426 A1 * | 7/2008 | Zhu | H01R 12/7058 | 439/79 |
| 2008/0182456 A1 * | 7/2008 | Zhang | H01R 13/658 | 439/626 |
| 2009/0218120 A1 * | 9/2009 | Oooka | H01R 12/721 | 361/679.55 |
| 2013/0178109 A1 * | 7/2013 | Ng | H01R 12/724 | 439/629 |

(Continued)

*Primary Examiner* — Truc T Nguyen

(74) *Attorney, Agent, or Firm* — Schwegman, Lundberg & Woessner

(57) ABSTRACT

A single manufactured piece of injection molded or 3D (three-dimensional) printed plastic, metal, rubber, or wax is provided. The piece is adapted to fit around a communication port receptacle and a corresponding portion of a Printed Circuit Board (PCB) where the communication port receptacle is located on the PCB. The piece includes a latch adapted to push down on a tab of a connector for a cord when the connector is inserted into the communication port receptacle to hold the connector within the communication port receptacle.

13 Claims, 4 Drawing Sheets

(56) References Cited

U.S. PATENT DOCUMENTS

| | | | | |
|---|---|---|---|---|
| 2013/0288507 | A1* | 10/2013 | Zhu | H01R 13/62 439/345 |
| 2013/0295783 | A1* | 11/2013 | Zeng | H05K 5/0013 439/55 |
| 2015/0207279 | A1* | 7/2015 | Little | H01R 24/60 439/676 |
| 2015/0364879 | A1* | 12/2015 | Morley | H01R 24/40 439/578 |
| 2019/0334276 | A1* | 10/2019 | Ichikawa | H01R 12/724 |
| 2021/0328369 | A1* | 10/2021 | Wu | H01R 13/6477 |
| 2022/0203014 | A1* | 6/2022 | Shuler | A61M 3/0262 |

* cited by examiner

SYSTEM AND APPARATUSES FOR COMMUNICATION PORT CORD RETENTION

BACKGROUND

Computing devices include a variety of communication port receptacles that permit wired connections to other devices or that permit wired connections to peripherals. These port receptacles are typically manufactured on the motherboards of the computing devices and are specific to types of communication that the computing devices support, such as Universal Serial Bus (USB), Ethernet, etc.

Some computing devices include a substantial number of port receptacles with varying types of communication. For example, a transaction terminal (such as an Automated Teller Machine, Point-Of-Sale (POS) terminal, Self-Service Terminal (SST), etc.) includes a variety of integrated peripherals necessary for performing transactions, such as a media repository/recycler/dispenser, a scanner, a combined scanner/weigh scale, a touchscreen display, Personal Identification Number (PIN) pad, printer, card reader, keyboard, etc.

Transaction terminals are subject to a lot of user-related stress and operating-environment stress, which can cause cord connections from the peripherals to the port receptacles to come loose over time and disengage or lose stable contact with the communication pins inside the port receptacles. This can be problematic for retailers because the cord connections are usually located inside a secure housing that can only be accessed by authorized staff. Furthermore, operators of the terminals may have no idea what is wrong with the terminals when cords are disengaged, which further delays correction of the problem. Typically, the terminals are unavailable for customer or staff use while the peripheral connections are disengaged from the port receptacles. In fact, the transaction software may detect the missing peripheral connection and prohibit any transaction processing until the connection is resolved.

Moreover, available physical space within the housing of the terminals is limited, such that locating and accessing a given port receptacle can be challenging for support staff. In some cases, some existing peripherals may need to be removed or relocated to gain physical access to the appropriate cord and port receptacle.

SUMMARY

In various embodiments, a system and apparatuses for communication port cord retention are presented.

According to an embodiment, a system for communication cord port retention is presented. The system comprises a Printed Circuit Board (PCB), a communication port receptacle of the PCB; and a port retention apparatus adapted to hook onto the PCB and over the communication port receptacle. The port retention apparatus comprises a latch to engage a tab on a connector of a cord and hold the connector within the communication port receptacle when the connecter is inserted into the communication port receptacle.

DETAILED DESCRIPTION

Figure 1:
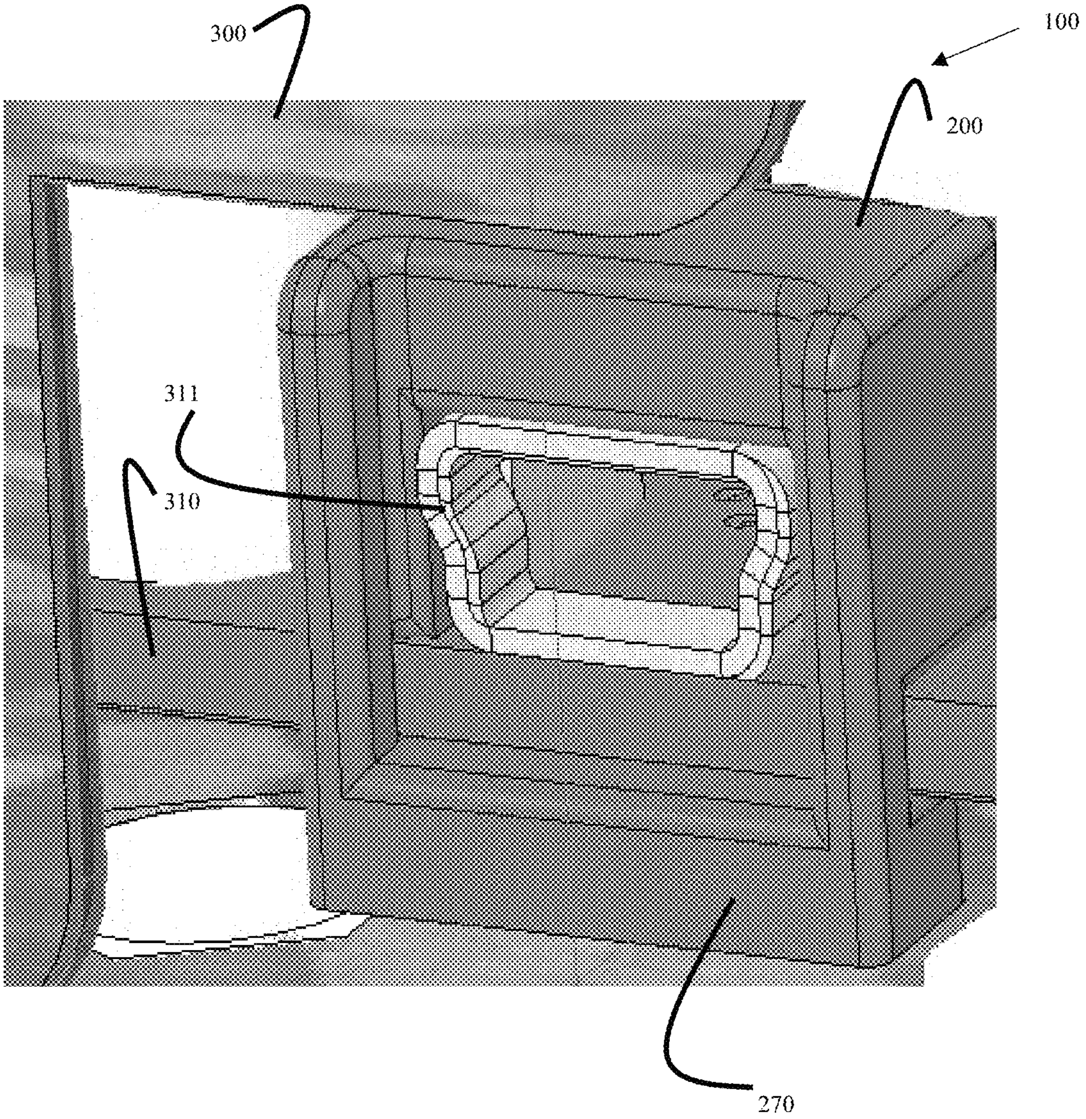
FIG. 1 is a diagram of a system for communication port cord retention, according to an example embodiment.

FIG. 1 is a diagram of a system 100 for communication port cord retention, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of communication port retention apparatuses presented herein and below.

As will be more completely discussed herein and below, the teachings provide a novel communication port retention apparatus. The apparatus affixes to an underside of a Printed Circuit Board (PCB) of a computing device and comprises an aperture that fits snuggly around an outer surface of a communication port receptacle of the PCB. A top underside of the apparatus includes a latch adapted to lock into an aperture on a top surface of a communication cord male connector, when the male connector is urged through the aperture and plugged into the communication port of the PCB through the communication port receptacle. Once plugged into the port of the PCB, the latch of the apparatus assures that the cord does not disengage its connection to the port, so movements or vibrations experienced by the PCB or cord will not jar loose the cord connection to the port receptacle. This provides superior cord connection stability and reliability.

System 100 comprises a communication port retention apparatus 200 and a computing device 300. The commuting device 300 comprising a PCB 310 and a communication port receptacle 311 affixed on the PCB 310.

As used herein and below "port receptacle" may be used synonymously and interchangeably with the term "port." This is a female connector manufactured on the PCB for connecting a device or peripheral associated with the computing device of the PCB. Inside the port receptacle are slots that receive pins from a connector of a cord associated with the connecting device or connecting peripheral. Pins of the receptacle map to pins of the connector and permit device-to-device connections and communications of a designated type (such as USB, display port, etc.).

Apparatus 200 (as illustrated more completely in FIG. 2) is a single injection-molded or a single 3D (3-Dimensional)-printed piece of plastic, rubber, wax, or metal (or combinations of these materials).

Apparatus 200 comprises a top surface 210, a bottom surface 220, two side surfaces 230 (just one of the two side surfaces 230 visible from FIG. 2—both side surfaces 230 are identical in size, dimensions, and shape), a PCB-facing surface 240 (may also be referred to herein as rear or back surface 240), a top underside surface 250, and an aperture 260. It is noted that the front surface 270 is illustrated in FIG. 1 and is not visible in FIG. 2, which illustrates a rear, bottom, and side view of apparatus 200.

Figure 2:
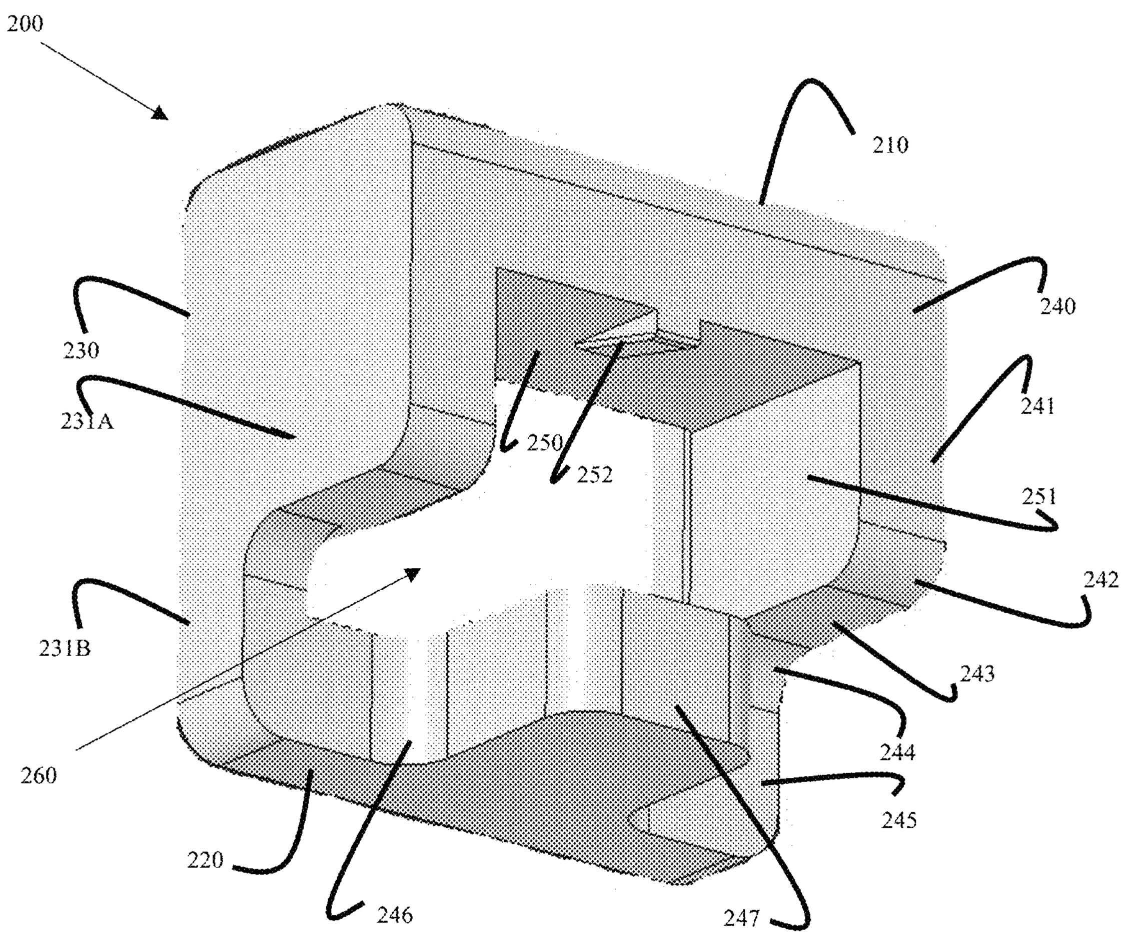
FIG. 2 is a diagram of a communication port retention apparatus, according to an example embodiment.

Dimensions of apparatus 200 are manufactured based on dimensions of communication port receptacle 311 and a thickness of PCB 310 of computing device 300, such that aperture 260 fits snuggly around or surrounds receptacle 311 and a tongue 247 of rear surface 240 fits under PCB 310 with a portion of the PCB 310 extending through aperture 260. An underside of PCB 310 rests on top of tongue 247 and top portions of PCB 310 that are adjacent to sides of communication port receptacle 311 rests under two extending underside surfaces 243 of apparatus 200. In this manner, apparatus 200 locks or snaps onto and around both PCB 310 and the outer surface of receptacle 311. A small portion of front surface 270 extends past the outer surface of PCB 310 while remaining portions of apparatus 100 are situated adjacent to side surfaces of receptacle 311, above receptacle 311, and above a top surface of PCB 310. FIG. 1 shows a front view of apparatus 200 snapped onto PCB 310, tongue 247 is under the bottom of PCB 310 (tongue 247 is not visible from the view presented in FIG. 1 but is illustrated in FIG. 2).

Side surface 230 comprise a top-side portion 231A and a bottom-side portion 231B. A height of top-sided portion 231A is greater than a height of bottom-side portion 231B. Moreover, a thickness or depth of top-side portion 231A is greater than a thickness or depth of bottom-side portion 231B.

Rear surface 240 includes a top-rear portion 241, a first top curved portion 242, an underside surface of the top-rear portion 243, a second top curved portion 244, a bottom-rear portion 245, a bottom curved portion 246, and tongue 247.

Top-rear portion 241 comprises the first top curved portion, the underside surface of the top-rear portion 243, and second top curved portion 244. Moreover, top-rear portion 241 extends above and surrounds a first portion of sides of aperture 260 that correspond to an outer surface of receptacle 311 when apparatus 210 is clipped onto PCB 310.

Bottom-rear potion 245 comprises bottom curved portion 246 and extends below and surrounds a second portion of aperture 260 that corresponding to top and bottom surfaces of PCB 310 when apparatus 200 is clipped onto PCB 310.

Top surface 210 is a uniform thickness extending from front surface 260 to rear surface 240.

Bottom surface 220 comprises two thicknesses, a first thickness not associated with tongue 247 and corresponding to thickness of 231B and a second thickness corresponding to tongue 247 (first thickness is less than the second thickness).

In an embodiment, tongue 247 extends from front surface 270 for a length that is equal to the depth or thickness of top surface 210, for a length that is shorter than the depth or thickness of top surface 210, or for a length that is greater than the depth or thickness of top surface 210.

Top underside surface 250 extends above aperture 260 and has a depth equal to top surface 210. Inside surfaces 251 (only one surface 251 visible from the view presented in FIG. 1) abut top underside surface 250 at substantially right angles and extend along the outer surface of receptacle 311 when apparatus 200 is clipped onto PCB 310. A rear outer-edge of top underside surface 250 comprises a latch 252 that extends from the rear outer-edge or top underside surface for a predefined distance towards front surface 270.

Figure 4:
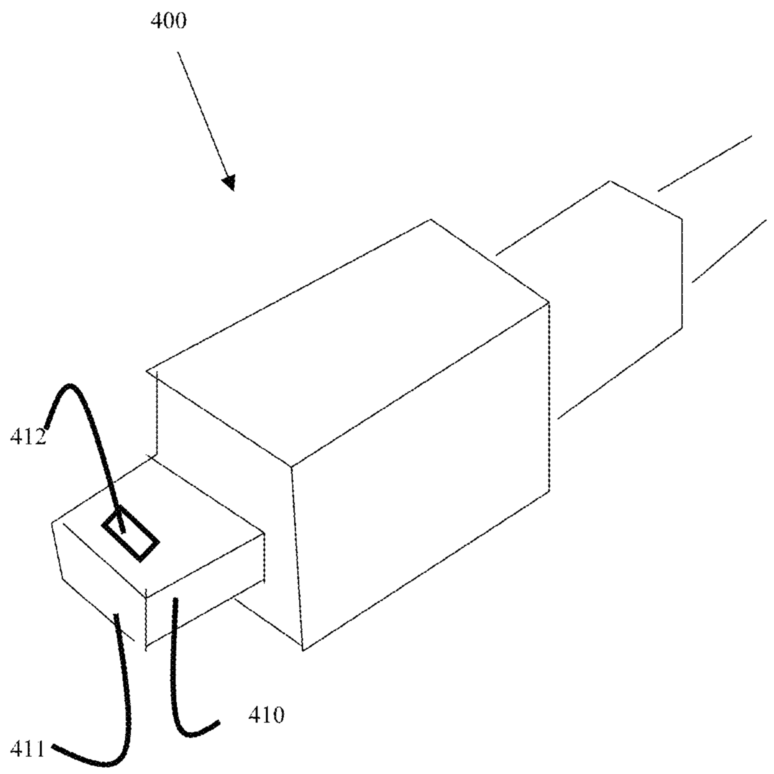
FIG. 4 PRIOR ART
FIG. 4 is a diagram of a prior art USB "B" cord.

Dimensions and shape of latch 252 correspond to a tab 412 for a male connector 410 of a cord 400 permitting latch 252 to press into an existing tab 412 and hold male connector 410 of cord 400 in place when cord pins 411 are plugged into port pins associated with communication port of receptacle 311 on PCB 310 (FIG. 4 illustrates an example communication wire 400 for a USB "B" cord). Thus, latch 252 secures male connector 410 into receptacle 311 when pins 411 are fully inserted into port pins of the corresponding port on PCB 310. This prevents the cord pins 411 from loosening and losing a connection to the port pins of PCB 310 when cord 400 is pulled upon or moved or when computing device 300 is moved or vibrated.

Apparatus 200 comprises a first portion (210, 230, 240, 241, 242, 243, 250, and 251), a second portion (220, 245, 246), a latch 252, and an aperture 260. The aperture 260 defined by an inside surface 251 of the first portion and a top surface of the second portion. The latch 252 extends down from the inside surface into the aperture 260, and the latch 252 is adapted to push into a tab 412 on a connector 410 of a cord 400 to secure the connector 410 when the connector 410 is inserted into a communication port receptacle 311 on a PCB 310. The aperture 260 is sized to receive an outer surface of the communication port receptacle 311 and to receive a corresponding portion of the PCB 310 (the portion of the PCB 310 upon which the port receptacle 311 is located).

The apparatus 200 is a single manufactured component that is produced through injection molding or 3D printing. Moreover, the single component 200 is adapted to hook/snap into the corresponding portion of the PCB 310 and surround the outer surface of the port receptacle 311.

Apparatus 200 comprises a front surface 270, side surfaces 230, a top surface 210, a back surface 240, a bottom surface 220, an aperture 260, a tongue 247, and a latch 252. The aperture 260 is defined by the top surface 210, bottom surface 220, and side surfaces 230. Furthermore, aperture 260 is sized to receive a communication port receptacle 311 and a portion of a PCB 310 that corresponds to the port receptacle 311. The tongue 247 extends from the front surface 270 horizontally towards the back surface 240 and along the bottom surface 240. The latch 252 extends downward from top surface 210 and latch 252 is adapted to push down into a tab 412 on a connector 410 of a cord 400 when the connector 410 is inserted into port receptacle 311 to hold connector 410 within the port receptacle 311.

Apparatus 200 is adapted to be hooked/snapped onto and removed from the portion of the PCB 310 that has the port receptacle 311.

In an embodiment, latch 252 is centered on an underside 250 of top surface 210 and located adjacent to the back surface 240.

Apparatus 200 increases a force required to remove male connector 410 of cord 400 from receptacle 311. This is achieved by hooking apparatus 200 onto PCB 310 through a portion of aperture 260 with tongue 247 under PCB 310 and a topside of PCB 310 firmly wedged through the aperture 260 against two extending underside surfaces 243. When male connector 410 is inserted into receptacle 311, latch 252 pressed firmly into tab 412 causing pins 411 to stay engaged and firmly inserted into the port corresponding to receptacle 311. Once male connector 410 is inserted to receptacle 311, latch 252 engages tab 412 creating an interlock. Apparatus 200 decreases cord fallout rates of wired peripheral devices to computing device 300 and reduces poor connections that are normally associated with loose or unstable cord connections to the computing device 300.

In an embodiment, apparatus 200 is sized and dimensioned to fit over a mini USB receptacle or a USB "B" receptacle and to hook onto a corresponding PCB associated with the computing device having the receptacle.

In an embodiment, apparatus 200 is sized and dimensioned to fit over a standard USB "A" receptacle and to hook onto a corresponding PCB associated with the computing device having the receptacle. In this embodiment, apparatus 200 may include two latches 252 situated to engage two tabs associated with a male connector of a USB "A" cord.

In an embodiment, apparatus 200 is sized and dimensioned to fit over a micro USB receptacle and to hook onto a corresponding PCB associated with the computing device having the receptacle.

In an embodiment, apparatus 200 is sized and dimensioned to fit over a display port or mini display port receptacle and to hook onto a corresponding PCB associated with the computing device having the receptacle.

In an embodiment, apparatus 200 includes no latch, a single latch 252, or includes two latches. Any latch-based embodiment includes one or more latches 252 that are sized and located on apparatus 200 to correspond to the type of port that it is manufactured for so as to engage any tabs on male connectors for that type of port.

Hooking apparatus 200 onto PCB 310 and around the outer surface of receptacle 311 does not require any special tools and can be done easily by hand of any user. Once fitted, apparatus 200 does not have to be adjusted as it is self-location. That is, apparatus 200 is manufactured and sized such that it cannot be fitted incorrectly and requires no special training to install and use.

Moreover, apparatus 200 is sized during manufacture to correspond to existing PCBs and existing communication ports of a desired type, such that apparatus 200 is usable across a wide range of computing devices and their corresponding peripheral connections.

Figure 3:
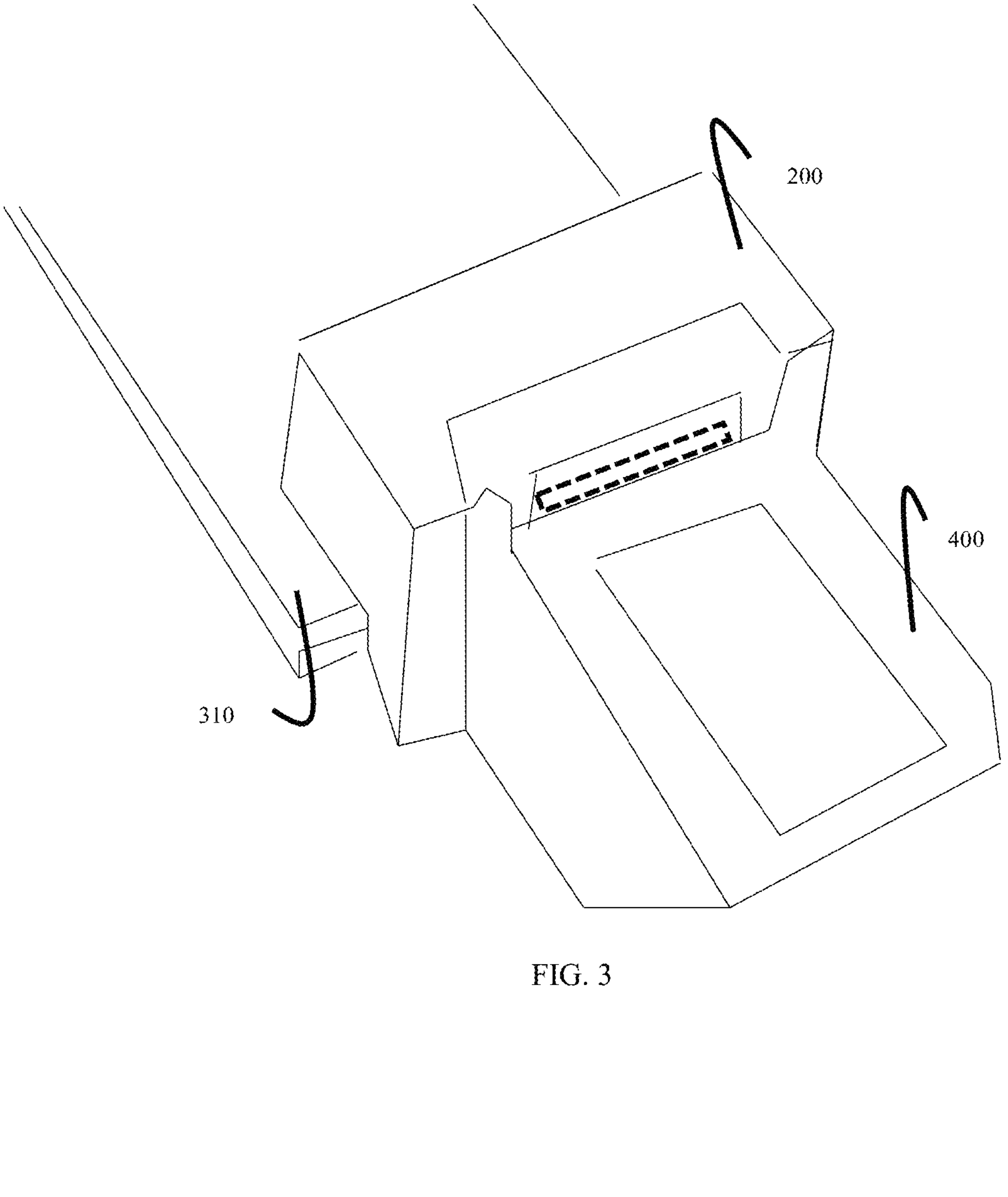
FIG. 3 is a diagram of communication port retention apparatus attached to a Printed Circuit Board (PCB) and a Universal Serial Bus (USB) cord, according to an example embodiment.

FIG. 3 illustrates apparatus 200 clipped onto PCB 310 and a connected cord 400 inserted through aperture 260 into receptacle 311.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A system, comprising:

a Printed Circuit Board (PCB);

a communication port receptacle of the PCB; and a port retention apparatus adapted to hook onto the PCB and over the communication port receptacle;

wherein the port retention apparatus comprises a latch to engage an existing tab on a connector of a cord to create an interlock and hold the connector within the communication port receptacle when the connecter is inserted into the communication port receptacle, wherein the latch extends down from a top surface and into a corresponding top surface of the connector of the cord when the connecter is inserted into the communication port receptacle;

wherein the port retention apparatus further comprises a first portion, a second portion, and an aperture;

wherein the latch extends into the aperture from an underside of the top surface and an inside surface of the first portion;

wherein second portion comprises a tongue adapted to hook under a bottom side of the PCB that corresponds to the communication port receptacle.

2. The system of claim 1, wherein the aperture is sized to receive the communication port receptacle and a corresponding portion of the PCB so that an inside surface of the first portion surrounds an outer surface of the communication port receptacle and so that the corresponding portion of the PCB rests on top of the tongue.

3. A system, comprising:

a Printed Circuit Board (PCB);

a communication port receptacle of the PCB; and a port retention apparatus adapted to hook onto the PCB and over the communication port receptacle;

wherein the port retention apparatus comprises a latch to engage an existing tab on a connector of a cord to create an interlock and hold the connector within the communication port receptacle when the connecter is inserted into the communication port receptacle, wherein the latch extends down from a top surface and into a corresponding top surface of the connector of the cord when the connecter is inserted into the communication port receptacle;

wherein the port retention apparatus is adapted to snap on and off the PCB at a location that corresponds to the communication port receptacle.

4. The system of claim 3, the communication port receptacle is a mini Universal Serial Bus (USB) port on the PCB.

5. The system of claim 3, wherein the communication port receptacle is a mini display port.

6. The system of claim 3, wherein the communication port receptacle is a micro Universal Serial Bus (USB) port on the PCB.

7. The system of claim 3, wherein the port retention apparatus is a single injection-molded or 3D (three-dimensional) printed piece of plastic, rubber, metal, or wax.

8. The system of claim 7, wherein a size and dimensions of the port retention apparatus depend on a thickness of the PCB and a port size and port dimensions for the communication port receptacle.

9. An apparatus, comprising:

a single component comprising;

a first portion;

a latch;

a second portion comprising a tongue; and an aperture defined by an inside surface of the first portion and a top surface of the second portion;

wherein the latch extends down from the inside surface into the aperture;

wherein the latch is adapted to push into an existing tab on a connector of a cord to create an interlock and to secure the connector when the connector is inserted into a communication port receptacle on a Printed Circuit Board (PCB), wherein the latch extends down from the inside surface of a top surface and into a corresponding top surface of the connector of the cord when the connecter is inserted into the communication port receptacle;

wherein the aperture is sized to receive an outer surface of the communication port receptacle and a corresponding portion of the PCB;

wherein the single component adapted to hook onto the corresponding portion of the PCB and surround an outer surface of the communication port receptacle;

wherein the single component is an injection molded or 3D (three-dimensional) printed piece of plastic, rubber, metal, or wax.

10. The apparatus of claim 9, wherein the communication port receptacle is a mini Universal Serial Bus (USB) port.

11. The apparatus of claim 9, wherein the communication port receptacle is a micro Universal Serial Bus (USB) port.

12. The apparatus of claim 9, wherein the communication port receptacle is a mini display port.

13. The apparatus of claim 9 further comprising, a second latch extended down from the inside surface of the first portion, wherein the second latch is adapted to push into a second tab on the connector of the cord to further secure the connector when the connector is inserted into a communication port receptacle on the PCB.

* * * * *